United States Patent [19]
Okada et al.

[11] Patent Number: 5,868,483
[45] Date of Patent: Feb. 9, 1999

[54] LIQUID CRYSTAL DISPLAY PROJECTOR

[75] Inventors: Takehiro Okada; Shozo Aono; Masanari Hashimukai; Makoto Hoshino, all of Osaka, Japan

[73] Assignee: Matsushita Electric Industrial Co., Ltd., Osaka, Japan

[21] Appl. No.: 845,500

[22] Filed: Apr. 24, 1997

[30] Foreign Application Priority Data

Apr. 25, 1996 [JP] Japan .................................... 8-105050
Dec. 12, 1996 [JP] Japan .................................... 8-331761

[51] Int. Cl.$^6$ .................................................. G03B 21/14
[52] U.S. Cl. ........................................... 353/101; 353/119
[58] Field of Search .................................... 353/101, 100, 353/119, 31, 122

[56] References Cited

U.S. PATENT DOCUMENTS

| | | | |
|---|---|---|---|
| 4,018,520 | 4/1977 | Aste | 353/101 |
| 5,347,324 | 9/1994 | Sasaki et al. | 353/119 |
| 5,642,927 | 7/1997 | Booth et al. | 353/101 |
| 5,651,599 | 7/1997 | Fujimori et al. | 353/119 |
| 5,669,688 | 9/1997 | Baar et al. | 353/119 |

FOREIGN PATENT DOCUMENTS

| | | |
|---|---|---|
| 4-298731 | 10/1992 | Japan . |
| 5-289050 | 11/1993 | Japan . |
| 7-114089 | 5/1995 | Japan . |
| 9-33880 | 2/1997 | Japan . |

*Primary Examiner*—William Dowling
*Attorney, Agent, or Firm*—Ratner & Prestia

[57] ABSTRACT

A liquid crystal display projector comprising a light source, a group of mirrors, liquid crystal display devices, a projection lens, a main body containing the light source, group of mirrors, liquid crystal display devices and projection lens, and a mechanism whereby the projection lens is allowed to retract into and protrude from the main body. The projection lens comprises an outer cylinder having a ring-like shape; a drive motor with a gear; a ring-like intermediate cylinder with a first cam groove, second cam groove and gearwork provided on the exterior thereof with the gearwork meshing with the gear of the drive motor and is installed on the inner side of the outer cylinder so as to be made movable by sliding; a first inner cylinder having a first axis to fit in the first cam groove and fits with the inner surface of the intermediate cylinder in the front portion thereof so as to be movable by sliding according to the movement of the first axis caused by the rotation of the first cam groove; a second inner cylinder having a second axis to fit in the second cam groove and fits toward the back of the inner surface of the intermediate cylinder so as to be movable by sliding according to the movement of the second axis caused by the rotation of the second cam groove; and a plurality of lenses installed in the cylinders at specified positions. The projection lens operates such that driving of the drive motor causes the intermediate cylinder to rotate and the rotation of the intermediate cylinder allows the projection lens to zoom by extending and retracting the first inner cylinder.

9 Claims, 6 Drawing Sheets

LIQUID CRYSTAL DISPLAY PROJECTOR

TECHNOLOGICAL FIELD OF THE INVENTION

The present invention relates to a liquid crystal display projector, whereby video images displayed on liquid crystal display panels and the like are projected on a screen.

BACKGROUND OF THE INVENTION

For many years by now, projectors using a metal halide lamp and the like as the light source, whereby video images displayed on liquid crystal panels are enlarged and projected on a screen, have been available on the market.

With such projectors, the light emitted from the light source is gathered on liquid crystal panels by means of mirrors and the like and projected on a screen through a projection lens.

There are two kinds of liquid crystal display projectors, one being a 1-panel type that employs one liquid crystal display panel and the other being a 3-panel type wherein three liquid crystal display panels are used and color splitting and color combining are performed by means of dichloic mirrors and the like.

Each respective type of the above has a projection lens protruding from the projector's main body cabinet.

Figure 6:
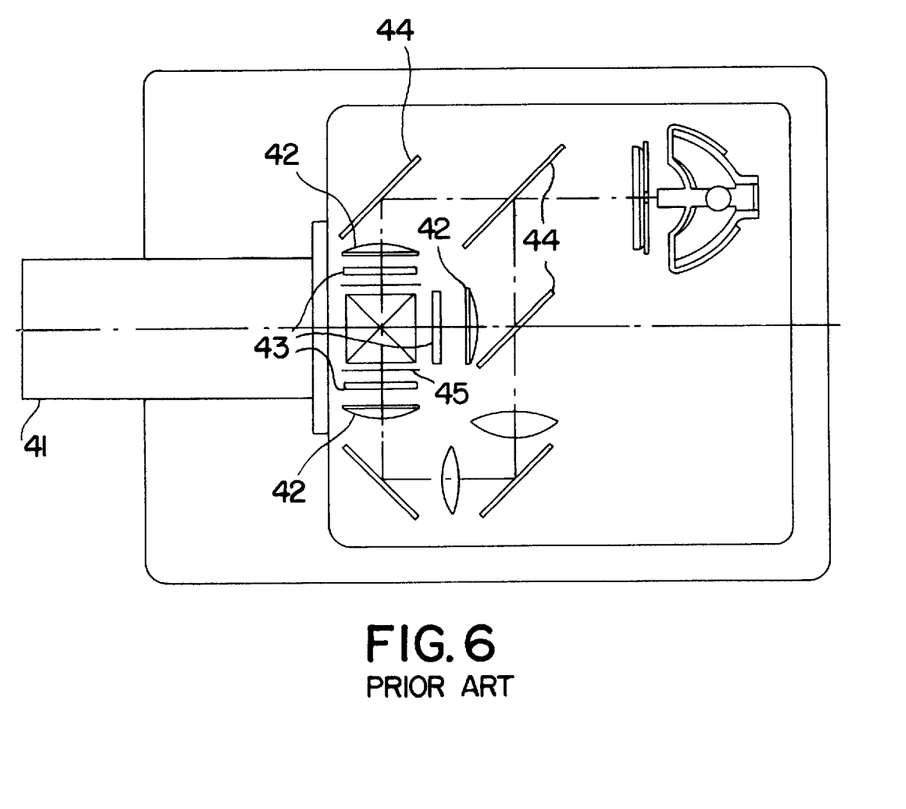
FIG. 6 is a plan view of a prior art liquid crystal display projector for explaining the optical system thereof

As shown in FIG. 6, a 1-panel type liquid crystal display projector has, in general, a projection lens 41, a field lens 42, a liquid crystal display panel 43 and polarizers 45 for light incident side and light radiant side.

There are two types in the projection lens 41, one having a fixed focus length and the other having a zooming function.

A 3-panel type liquid crystal display projector is basically of the same structure except for having half mirrors 44 that are additionally built in for color splitting and combining.

These types of liquid crystal display projectors were proposed in a Japanese patent application published for public examination, Showa 62(1987)-316710, for example.

Each respective liquid crystal display projector of 1-panel type and 3-panel type has generally a structure wherein a projection lens protrudes from the main body cabinet of the projector due to limitations in layout.

The structure wherein the projection lens protrudes has often caused a problem of damaging the protruding lens and the like when a liquid crystal display projector is carried. In addition, the protruding projection lens has imposed many restrictions on designing liquid crystal display projectors, thereby leading to a reduction in freedom of design. Furthermore, there is a drawback that dust easily settles on a protruding projection lens.

SUMMARY OF THE INVENTION

A liquid crystal display projector of the present invention comprises:
 a light source;
 a group of mirrors for splitting and combining the light from the light source;
 liquid crystal devices to control passage of the light;
 a projection lens with a function of zooming in or out the images of light passed and formed by the liquid crystal devices;
 a main body cabinet that contains the light source, group of mirrors, liquid crystal devices and projection lens; and
 a mechanism whereby an operation of protruding and retracting of the projection lens from and into the main body cabinet, respectively, is made possible.

What is particularly preferred in the foregoing structure is to provide functions whereby:
 the projection lens retracts into the main body cabinet when electric power is turned off; and
 the projection lens protrudes from the main body cabinet when electric power is turned on.

Further, what is particularly preferred in the foregoing structure is to make the projection lens comprise:
 a ring-like intermediate cylinder;
 a drive motor for driving the above intermediate cylinder;
 an outer cylinder that fits with the outer surface of the intermediate cylinder;
 an inner cylinder that fits with and is allowed to slide along the inner surface of the intermediate cylinder; and
 a plurality of lenses installed in at least one of the foregoing inner cylinder, intermediate cylinder and outer cylinder, and
 the above intermediate cylinder is rotated according to the rotation of the drive motor and the rotation of the intermediate cylinder causes the inner cylinder to slide out of or slide in the other cylinder and intermediate cylinder, thus enabling the operation of protruding and retracting of the projection lens as described in the above.

Still further, what is particularly preferred in the foregoing structure is to make the projection lens comprise:
 a ring-like intermediate cylinder having a first cam groove, second cam groove and gearwork that is provided on the exterior thereof;
 an outer cylinder that fits with the outer surface of the intermediate cylinder and has a drive motor with a gear to mesh with the foregoing gearwork of the intermediate cylinder;
 a first inner cylinder that has a first axis to fit in the above first cam groove and fits with the inner surface of the above intermediate cylinder, yet allowed to slide along the inner surface of the intermediate cylinder according to the movement of the first axis caused by the rotation of the first cam groove;
 a second inner cylinder that has a second axis to fit in the above second cam groove and fits with the inner surface of the above intermediate cylinder, yet allowed to slide along the inner surface of the intermediate cylinder according to the movement of the second axis caused by the rotation of the second cam groove; and
 a plurality of lenses installed in the foregoing first inner cylinder, second inner cylinder, intermediate cylinder and outer cylinder as designated for installation of lenses in accordance with a given specification.

Accordingly, the intermediate cylinder is rotated according to the rotation of the drive motor and the rotation of the intermediate cylinder causes the inner cylinders to move by sliding along the outer surfaces and inside of the outer cylinder.

Therefore, the rotation of the intermediate cylinder from a first position to a second position in the first cam groove of the intermediate cylinder causes the projection lens to zoom and the rotation of the intermediate cylinder from the second position to a third position in the first cam groove causes the first inner cylinder to slide inside of the outer cylinder.

Still further, what is particularly preferred in the foregoing structure is to have the outer cylinder provided with a first elongated hole extending in length in the sliding direction thereof and the first inner cylinder provided with a second elongated hole extending in length in the sliding direction thereof.

Accordingly, the intermediate cylinder is rotated according to the rotation of the drive motor and the rotation of the intermediate cylinder causes the afore-mentioned first axis to move along the first elongated hole.

As a result, the inner cylinder moves by sliding out of and sliding into the outer cylinder.

With each respective structure as described in the above, no lenses are protruding from the main body cabinet of a liquid crystal display projector when the projector is carried, thereby eliminating dangers to damage lenses. Furthermore, the main body cabinet of a liquid crystal display projector can be made simple in design, looking like a rectangular prism that is similar to the configuration of a suit case. In addition, such a novel design as a door provided in front of the projection lens side of a liquid crystal display projector is possible, for example. Thus, production of liquid crystal display projectors having whatever designs as desired is now possible.

BRIEF DESCRIPTION OF THE DRAWINGS

FIGS. 1(a) and 1(b) show a liquid crystal display projector in an exemplary embodiment of the present invention when electric power is turned on, including a diagram for explaining the optical system used in the project.

FIGS. 2(a) and 2(b) are diagrams explaining the optical system of the liquid crystal display projector of FIGS. 1(a) and 1(b) when electric power is turned off.

FIGS. 3(a) and 3(b) show the structure of a projection lens zoomed for wide-angle projection as used in a liquid crystal display projector in an exemplary embodiment of the present invention.

FIGS. 4(a) and 4(b) show the structure of a projection lens zoomed for close-up projection as used in a liquid crystal display projector in an exemplary embodiment of the present invention.

FIGS. 5(a) and 5(b) show the structure of a projection lens as used in a liquid crystal display projector in an exemplary embodiment of the present invention when electric power is turned off.

Key to Reference Numerals and Symbols

1 Light Source
2 Mirror
3 Liquid Crystal Panel
4 Prism
5 Projection Lens
6 Main Body Cabinet
8 Intermediate Cylinder
8a First Cam Groove
8b Second Cam Groove
8c Gearwork
9 Drive Motor
10 Outer Cylinder
10a First Elongated Hole
11 First Inner Cylinder
11a Second Elongated Cylinder
12 Second Inner Cylinder
13 Group of Lenses
13(L1) First Lens
13(L2) Second Lens
13(L3) Third Lens
13(L4) Fourth Lens
14 First Pin
15 Second Pin

DETAILED DESCRIPTION OF PREFERRED EMBODIMENTS

Next, a few exemplary embodiments of the present invention will be explained with reference to FIG. 1 through FIG. 5.

Exemplary Embodiment 1

Figure 1A:
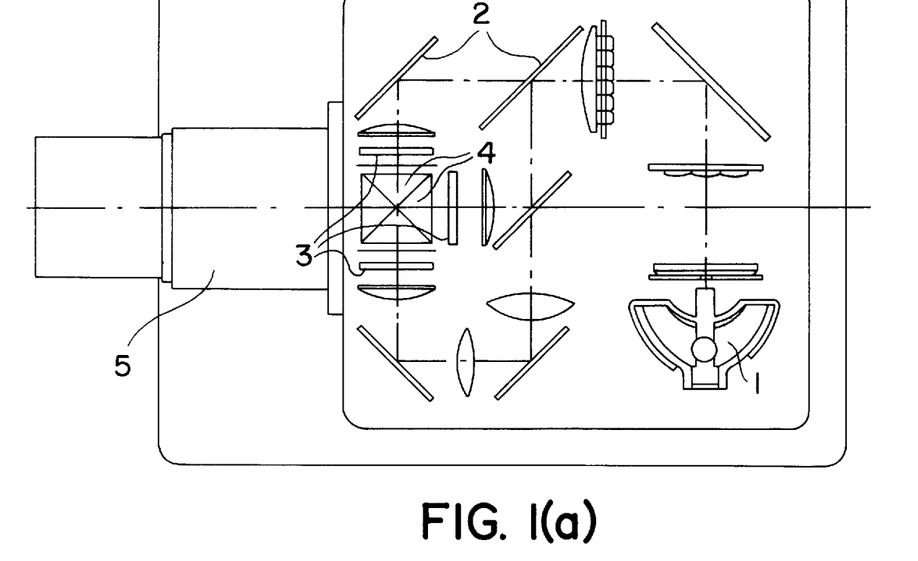
FIG. 1(a) is a plan view and FIG. 1 (b) is a front view of the liquid crystal display projector.
Figure 1B:
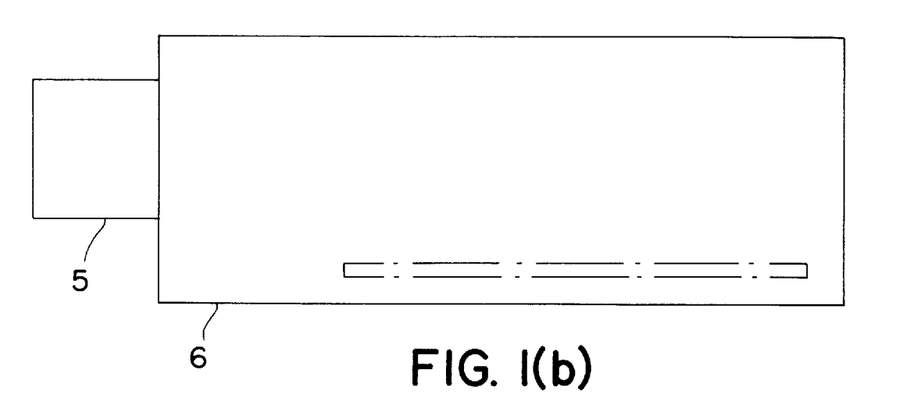

FIGS. 1(a) and 1(b) show the main body of a 3-panel type liquid crystal display projector in an exemplary embodiment of the present invention when electric power is turned on and a diagram of the whole optical system used in the projector.

FIG. 1(a) is a plan view and FIG. 1(b) is a front view of the liquid crystal display projector.

Figure 2A:
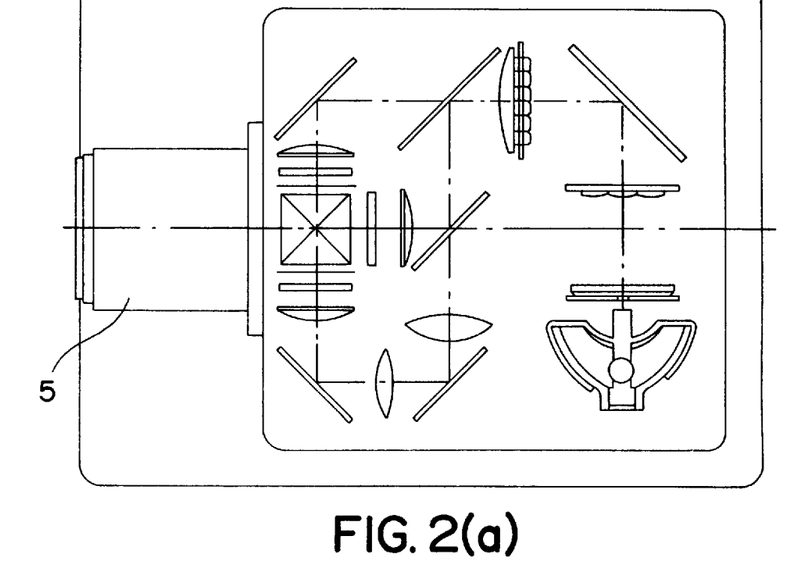
FIG. 2(a) is a plan view and FIG. 2(b) is a front view of the liquid crystal display projector.
Figure 2B:
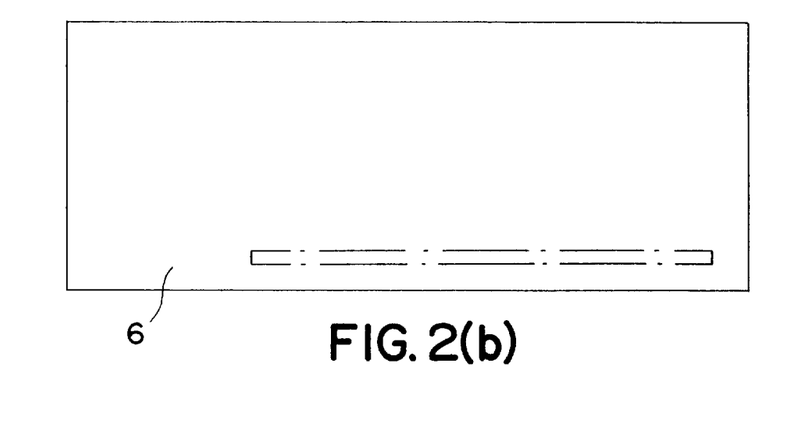

FIGS. 2(a) and 2(b) show how the projector's main body looks when electric power is turned off FIG. 2(a) is a plan view and FIG. 2(b) is a front view of the projector.

FIG. 3(a) to FIG. 5(b) show the structure of a projection lens as used in the liquid crystal display projector in the present exemplary embodiment.

Figure 3A:
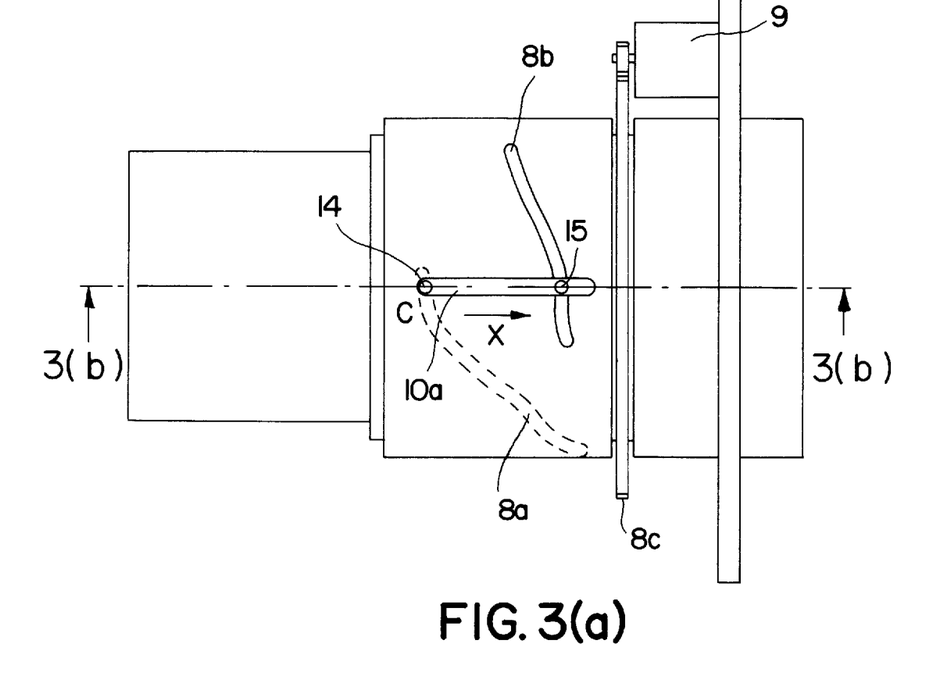
FIG. 3(a) is a plan view and FIG. 3(b) is a cross-sectional view of the projection lens.
Figure 3B:
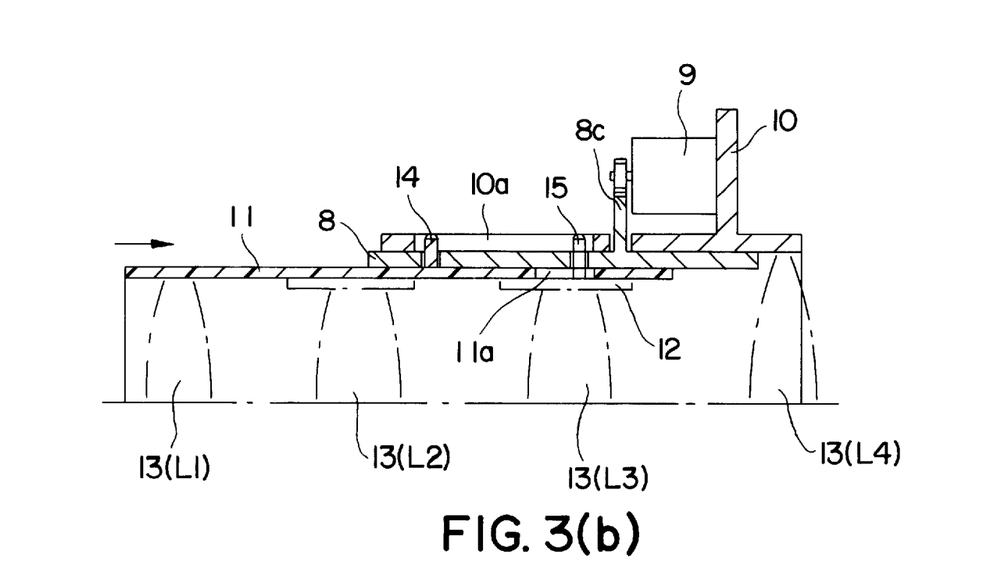
Figure 4A:
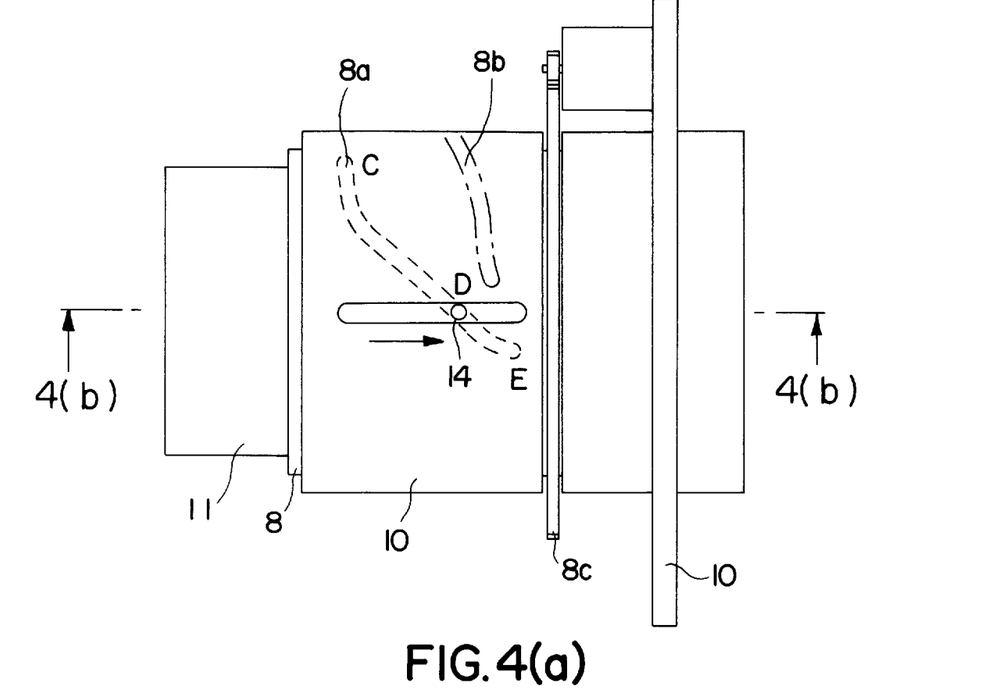
FIG. 4(a) is a plan view and FIG. 4(b) is a cross-sectional view of the projection lens.
Figure 4B:
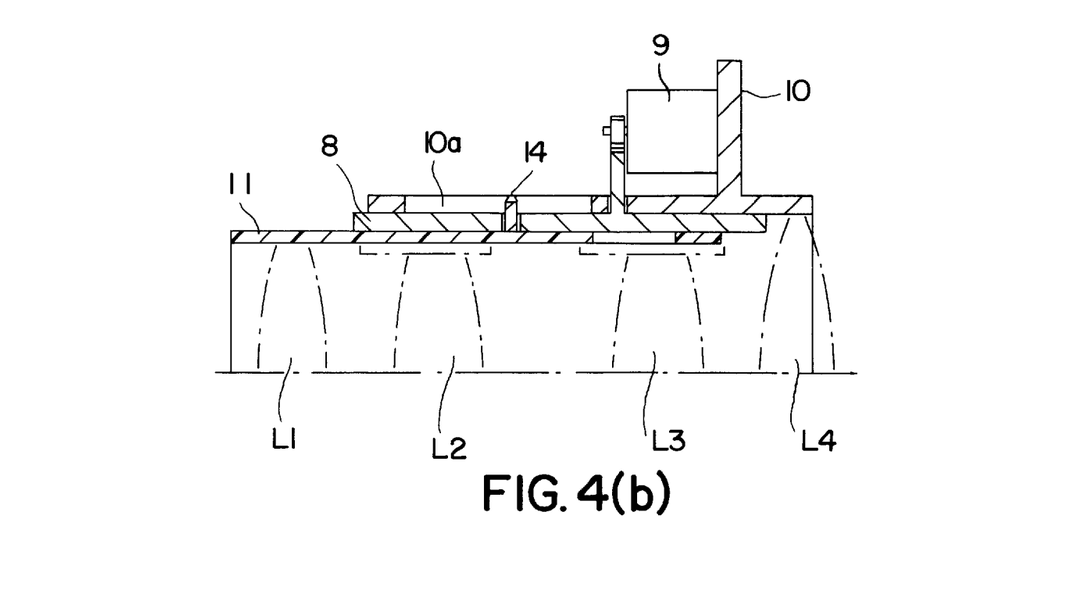
Figure 5A:
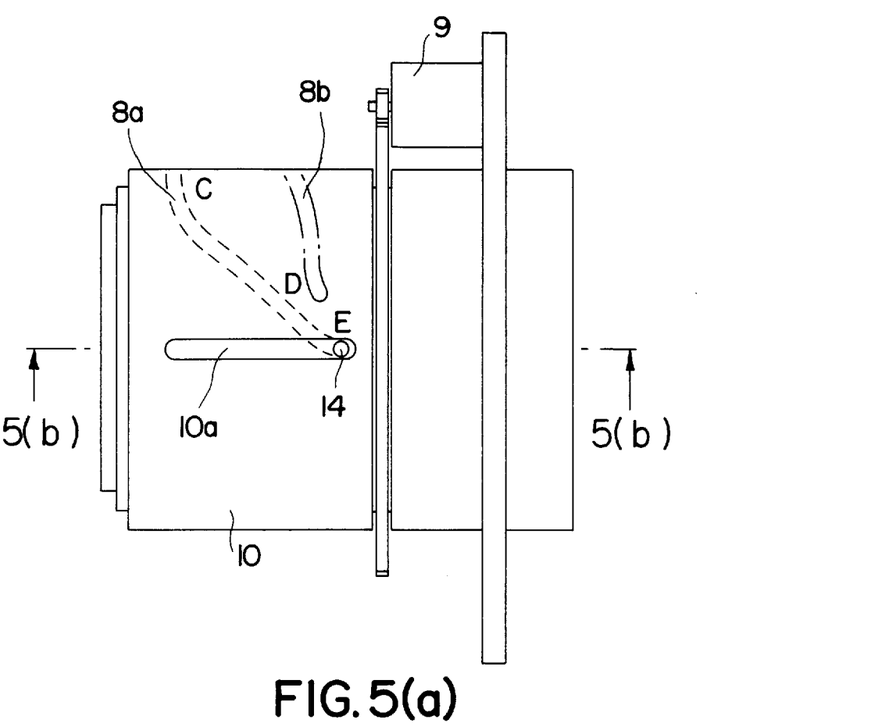
FIG. 5(a) is a plan view and FIG. 5(b) is a cross-sectional view of the projection lens.
Figure 5B:
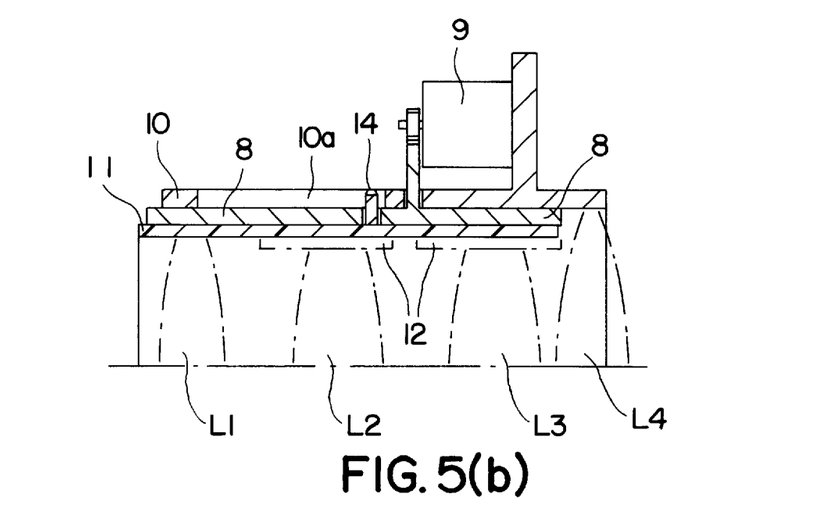

FIGS. 3(a) and 3(b) show a state wherein the projection lens is zoomed for wide-angle projection, FIGS. 4(a) and 4(b) show a state wherein the projection lens is zoomed for close-up projection and FIGS. 5(a) and 5(b) show a state of the projection lens when electric power is turned off.

FIG. 3(a), FIG. 4(a) and FIG. 5(a) are plan views of the projection lens in each respective state thereof as mentioned above.

FIG. 3(b), FIG. 4(b) and FIG. 5(b) are partially sectional views of the projection lens looked in the directions as indicated by arrow 3(a), 4(a) and 5(a) respectively.

As illustrated in FIG. 1(a), the light emitted from a lamp 1 serving as a light source is split into red, green and blue colors by a plurality of mirrors 2.

Each respective color light thus produced is incident on a corresponding liquid crystal panel 3 serving as a liquid crystal display device.

Then, all the lights of the images displayed in each respective color on the liquid crystal panels 3 are combined to form image lights in natural color by means of a prism 4 and the like.

The composite image lights of natural color are projected on a screen to form enlarged images by a projection lens 5. All the components as mentioned above are contained inside of a main body cabinet 6.

Each respective liquid crystal panel 3 is capable of forming images of light by means of a plurality of liquid crystal pixels, each of which is acting as a light valve to pass or block light.

The projection lens 5 comprises:

an intermediate cylinder 8 with a ring-like cross-section;

a drive motor 9 serving as a driving means to move the intermediate cylinder 8;

an outer cylinder 10 fitted with the outer surface of the intermediate cylinder 8;

a first inner cylinder 11 fitted with and yet capable of sliding on the inner surface of the intermediate cylinder 8;

a second inner cylinder 12 installed in the back inside of the first cylinder 11 to slide on the inner surface thereof; and a plurality of lenses 13 mounted on the first inner cylinder 11, second inner cylinder 12, intermediate cylinder 8 and outer cylinder 10 at specified positions thereof.

The intermediate cylinder 8 has a first cam groove 8a and second cam groove 8b formed on the outer surface thereof and also has gearwork 8c provided on the exterior thereof The outer cylinder 10 is completely contained in the main body cabinet 6 and the end thereof is not sticking out of the main body cabinet 6.

The shape of the first cam groove 8a and second cam groove 8b are curved so that the first inner cylinder 11 and second inner cylinder 12 are allowed to move by sliding, respectively.

With the present exemplary embodiment, the first cam groove 8a and second cam groove 8b are curved in a direction slanting from the perimeter of the circular outer surface of the intermediate cylinder 8, respectively.

The drive motor 9 is mounted on the outer cylinder 10. The drive motor 9 has a gear which meshes with the gearwork 8c.

With the present exemplary embodiment, the plurality of lenses 13 include a first lens 13 (L1) and second lens 13 (L2) installed inside the first inner cylinder 11, a third lens 13 (L3) installed inside the second inner cylinder 12 and a fourth lens 13 (L4) installed inside the outer cylinder 10.

According to the foregoing structure, the rotation of drive motor 9 causes intermediate cylinder 8 to rotate. The rotation of the intermediate cylinder 8 causes the first inner cylinder 11 to move by sliding out of and into the outer cylinder 10.

Next, a more detailed explanation will be made on the present exemplary embodiment.

The first inner cylinder 11 is provided with a first pin 14 which is insertable in the first cam groove 8a and the second inner cylinder 12 is provided with a second axis 15 which is insertable in the second cam groove 8b.

The outer cylinder 10 is provided with a first elongated hole 10a, the length of which extends in the same direction as the first inner cylinder 11 slides.

The first inner cylinder 11 is provided with a second elongated hole 11a at a position opposite to the first elongated hole 10a and the second axis 15 is inserted in the first elongated hole 10a running through the second elongated hole 11a.

When the drive motor 9 runs, the intermediate cylinder 8 is rotated over a specified angle.

At this time, the first pin 14 is moved in the direction indicated by an arrow "X" as shown in FIG. 3(a) along the first elongated hole 10a according to the rotational positions of the first cam groove 8a.

As a result, the first inner cylinder 11 with the first lens 13 (L1) and second lens 13 (L2) installed therein is moved in the direction as indicated by the arrow "X".

In the same way as above, the second inner cylinder 12 is also moved in the direction of arrow "X" along the first elongated hole 10a of the outer cylinder 10 according to the rotational positions of the second cam groove 8b.

An explanation on the fourth lens 13 (L4) installed inside the outer cylinder 10 is omitted since it is a not relevant to the present invention.

Interlocking with the rotation of the intermediate cylinder 8, over a specified angle when the drive motor runs, is first inner cylinder 11. First inner cylinder 11 slides along first cam groove 8a to reach a specified position and second inner cylinder 12 slides along second cam groove 8b to reach a specified position.

At this time, the projection lens 5 is allowed to change positions thereof for zooming from wide-angle projection to close-up projection by rotating over an angle corresponding to a travel of the first axis 14 from a position "C" to position "D" along the first cam groove 8a.

The first inner cylinder 11 retracts inside outer cylinder 10 while projection lens 5 rotates over an angle corresponding to a travel of the first pin 14 from a position "D" to position "E" along first cam groove 8a. FIGS. 3(a) and 3(b) show the state of wide-angle projection, where the first inner cylinder 11 has the greatest protrusion from the outer cylinder 10 of the projector's main body cabin 6.

FIGS. 4(a) and 4(b) show the state of close-up projection, where the first inner cylinder 11 slightly protrudes from the outer cylinder 10 of the projector's main body cabin 6.

In FIGS. 5(a) and 5(b), the first inner cylinder 11 retracted inside the outer cylinder 10 of the projector's main body cabin 6 and the second inner cylinder 12 is retracted further back inside the outer cylinder 10.

The control of the stopping angle for drive motor 9 is made by means of a timing switch, which is not shown in the drawing.

According to the structure as described above, when electric power is turned off, the entire projection lens 5 is housed inside the projector's main body cabin 6 as shown in FIGS. 5(a) and 5(b).

When electric power is turned on, the first inner cylinder 11 protrudes from the main body cabin 6. The control of zooming drive for wide-angle projection and close-up projection is conducted by means of a specified mechanism, which is not shown in the drawings.

In the present exemplary embodiment, it is preferred to have the outer cylinder 10 fixed to the main body cabin 6. However, the foregoing is not necessarily needed because the first inner cylinder 11 is allowed to protrude from the main body cabin 6.

In the foregoing, it is also possible to employ a structure wherein the second inner cylinder 12, second cam groove 8b and second pin 15 are not in place. In this case, the first inner cylinder 11 protrudes from, and retracts into, the outer cylinder 10 and intermediate cylinder 8 by sliding.

In other words, the projection lens 5 protrudes from, and retracts into, the main body cabin 6.

In the foregoing structure, it is also possible to have the second inner cylinder 12 placed deep within the intermediate cylinder 8.

In this case, it is not necessary to form the elongated hole 11a on the surface of the first inner cylinder 11 and the second pin 15 is moved while being engaged in the first elongated hole 10a and second cam groove 8b.

Accordingly, the structure disclosed by the present invention, the following effects can be achieved:

when electric power is turned off, a projection lens does not protrude from a projector's main body cabin and is housed inside the main body cabin, thereby preventing lenses from becoming damaged when a liquid crystal display projector is transported.

Furthermore, dust is prevented from settling on the lenses. Since dust is prevented from entering into the area where the liquid crystal panels are installed, designing of a dust proof structure can be simple.

In addition, a simple design of a rectangular prism like configuration that appears like a suit case is possible. Moreover, it is possible to design a liquid crystal display projector with a desired appearance, resulting in enhanced design freedom.

A simpler structure needed for an operation of protruding and retracting a projection lens contributes to a reduction in production cost.

What is claimed:

1. A liquid crystal display projector for use with a light source comprising:
   a mirror for splitting and combining light from said light source;
   a liquid crystal device to control passage of said light from said mirror so as to form an image;
   a projection lens for zooming in or out from said image formed by said liquid crystal device;
   a main body containing i) said light source, ii) said mirror, iii) said liquid crystal device and iv) said projection lens; and
   a mechanism for extending and retracting said projection lens from and into said main body, respectively,
   wherein said projection lens retracts into said main body cabin when an electric power is removed from said projector, and said projection lens extends from said main body when the electric power is applied to said projector.

2. A liquid crystal display projector for use with a light source comprising;
   a mirror for splitting and combining light from said light source;
   a liquid crystal device to control passage of said light from said mirror so as to form an image;
   a projection lens for zooming in or out from said image formed by said liquid crystal device, said projection lens including:
     i) an intermediate cylinder having a ring-like shape;
     ii) driving means coupled to said intermediate cylinder;
     iii) an outer cylinder coupled to an outer surface of said intermediate cylinder;
     iv) an inner cylinder coupled to an inner surface of said intermediate cylinder; and
     v) a plurality of lenses installed at least in one of said inner cylinder, said intermediate cylinder and said outer cylinder;
   a main body containing i) said light source, ii) said mirror, iii) said liquid crystal device and iv) said projection lens; and
   a mechanism for extending and retracting said projection lens from and into said main body, respectively,
   wherein said intermediate cylinder is rotated by said driving means, and said inner cylinder moves along said outer cylinder responsive to the rotation of said intermediate cylinder.

3. The liquid crystal display projector according to claim 2, wherein said outer cylinder is fixed to said main body, and a tip end of said outer cylinder remains within said main body.

4. A liquid crystal display projector for use with a light source comprising:
   a mirror for splitting and combining light from said light source;
   a liquid crystal device to control passage of said light from said mirror so as to form an image;
   a projection lens for zooming in or out from said image formed by said liquid crystal device, said projection lens including:
     i) an outer cylinder having a ring-like shape;
     ii) a drive motor fixed to said outer cylinder and having a gear;
     iii) an intermediate cylinder having a ring-like shape which has a first cam groove and gearwork, said intermediate cylinder coupled to an inner side of said outer cylinder;
     iv) a first inner cylinder having a first pin coupled to said first cam groove, said first inner cylinder coupled to an inner surface of said intermediate cylinder; and
     v) a plurality of lenses installed in at least one of said first inner cylinder, said intermediate cylinder and said outer cylinder,
   a main body containing i) said light source, ii) said mirror, iii) said liquid crystal device and iv) said projection lens; and
   a mechanism for extending and retracting said projection lens from and into said main body, respectively,
   wherein driving of said drive motor causes said intermediate cylinder to rotate, the rotation of said intermediate cylinder causes said first pin to move along said first cam groove, and the movement of said first pin causes said first inner cylinder to extend from and retract into said outer cylinder.

5. The liquid crystal display projector according to claim 4, wherein said first cam groove has a first position, a second position and a third position and when said first pin moves from said first position to said second position of said first cam groove, said projection lens is zoomed while said projection lens remains in said extended state, and
   as said first pin moves from said second position to said third position, said first inner cylinder slides into said outer cylinder.

6. The liquid crystal display projector according to claim 4, wherein said outer cylinder has a first elongated hole extending in length in said sliding direction on the outer surface thereof,
   rotation of said drive motor causes said intermediate cylinder to rotate,
   as said intermediate cylinder rotates, said first axis is moved along said first elongated hole, and thereby said first inner cylinder being allowed to slide along the inner side surface of said intermediate cylinder and to perform said protruding from and retracting into the inside of said intermediate cylinder.

7. A liquid crystal display projector for use with a light source comprising:
   a mirror for splitting and combining light from said light source;
   a liquid crystal device to control passage of said light from said mirror so as to form an image;
   a projection lens for zooming in or out from said image formed by said liquid crystal device, said projection lens including:
     i) an outer cylinder having a ring-like shape;
     ii) a drive motor coupled to said outer cylinder and having a gear;
     iii) an intermediate cylinder having a ring-like shape which has a first cam groove, a second cam groove and gearwork on an exterior portion of said intermediate cylinder, said gearwork coupled to said gear and installed on an inner portion of said outer cylinder;

iv) a first inner cylinder having a first pin coupled to said first cam groove and fitting within an inner surface of said intermediate cylinder in a portion thereof;

v) a second inner cylinder having a second pin coupled to said second cam groove and fitting within the inner surface of said intermediate cylinder at a back portion thereof; and vi) a plurality of lenses installed in at least one of said first inner cylinder, said intermediate cylinder and said outer cylinder, a main body containing i) said light source, ii) said mirror, iii) said liquid crystal device and iv) said projection lens; and a mechanism for extending and retracting said projection lens from and into said main body, respectively, wherein driving of said drive motor causes said intermediate cylinder to rotate, the rotation of said intermediate cylinder from said first position to said second position of said first cam groove causes said projection lens to be zoomed while said projection lens staying under said protruding state, and the rotation of said intermediate cylinder from said second position to said third position of said first cam groove causes said first inner cylinder to slide inside said outer cylinder.

8. The liquid crystal display projector according to claim 7, wherein said outer cylinder has a first elongated hole extending in length in said sliding direction on the surface thereof, said second inner cylinder is installed at an interior portion of said first inner cylinder, and said first inner cylinder has a second elongated hole with a length formed on the surface thereof at a position opposing said first cam groove, wherein rotation of said drive motor causes said intermediate cylinder to rotate and, as said intermediate cylinder rotates, said first axis is moved along said first elongated hole and said second axis is moved along said second elongated hole and first elongated hole, thereby said first inner cylinder slides along the inner side surface of said intermediate cylinder and said second inner cylinder slides along the inner side surface of said first inner cylinder so that said first inner cylinder extends from and retracts into the inside of said intermediate cylinder.

9. The liquid crystal display projector according to claim 7, wherein said outer cylinder has a first elongated hole extending in length in said sliding direction on the surface thereof, said second inner cylinder is installed at a rear interior portion of said intermediate cylinder toward the back portion thereof, said intermediate cylinder rotates responsive to said drive motor, and said first pin and said second pin move along said first elongated hole responsive to the rotation of said intermediate cylinder, thereby said first inner cylinder and said second cylinder move along the inner side surface of said intermediate cylinder so that said first inner cylinder extends from and retracts into the inside of said intermediate cylinder.

* * * * *